United States Patent
Paruchuri et al.

(10) Patent No.: US 10,855,555 B2
(45) Date of Patent: Dec. 1, 2020

(54) ON-DEMAND PROBING FOR QUALITY OF EXPERIENCE METRICS

(71) Applicant: Juniper Networks, Inc., Sunnyvale, CA (US)

(72) Inventors: Vijay Sai Ram Paruchuri, Bangalore (IN); Rajneesh Kumar, Bangalore (IN); Ravi Kumar G V Subrahmanya, Hyderabad (IN); Unni Dilip, Bangalore (IN); Sanjay Kumar Gupta, Bangalore (IN); Bhaskar Jain, Bangalore (IN); Sai Sundar Ramamurthy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/298,996

(22) Filed: Mar. 11, 2019

(65) Prior Publication Data
US 2020/0296012 A1    Sep. 17, 2020

(51) Int. Cl.
*H04L 12/24*    (2006.01)
*H04L 12/26*    (2006.01)
(Continued)

(52) U.S. Cl.
CPC ...... *H04L 41/5009* (2013.01); *H04L 41/5025* (2013.01); *H04L 43/0835* (2013.01);
(Continued)

(58) Field of Classification Search
CPC ............. H04L 41/5009; H04L 47/2475; H04L 41/5025; H04L 43/0835; H04L 45/306; H04L 47/6215; H04L 45/24; H04L 43/10
See application file for complete search history.

(56) References Cited

U.S. PATENT DOCUMENTS 7,082,463 B1    7/2006 Bradley et al.
7,599,307 B2 *  10/2009 Seckin ................ H04L 41/5006
                                              370/252
(Continued)

FOREIGN PATENT DOCUMENTS

WO    2013184846 A1    12/2013
WO    2016150748 A1     9/2016

OTHER PUBLICATIONS

Extended Search Report from counterpart European Application No. 19180551.4, dated Oct. 22, 2019, 7 pp.

*Primary Examiner* — Lakeram Jangbahadur
(74) *Attorney, Agent, or Firm* — Shumaker & Sieffert, P.A.

(57) ABSTRACT

In general, the disclosure describes techniques for evaluating application quality of experience metrics over a software-defined wide area network. For instance, a network device may receive an application data packet of a data flow for an application. In response to receiving the application data packet, the network device may assign the data flow to a first link of a plurality of links and initiate a probing process for the data flow on the first link to determine one or more quality of experience (QoE) metrics for the first link. The network device may, at a later time, detect that the data flow is no longer being received. In response to detecting that the data flow is no longer being received, the network device may cease the probing process for the data flow on the first link.

20 Claims, 4 Drawing Sheets

(51) Int. Cl.
*H04L 12/707* (2013.01)
*H04L 12/863* (2013.01)
*H04L 12/725* (2013.01)
*H04L 12/859* (2013.01)

(52) U.S. Cl.
CPC .............. *H04L 43/10* (2013.01); *H04L 45/24* (2013.01); *H04L 45/306* (2013.01); *H04L 47/2475* (2013.01); *H04L 47/6215* (2013.01)

(56) References Cited

U.S. PATENT DOCUMENTS

| | | | | |
|---|---|---|---|---|
| 2015/0195149 | A1* | 7/2015 | Vasseur | H04L 41/5009 370/252 |
| 2016/0028608 | A1* | 1/2016 | Dasgupta | H04L 43/16 370/252 |
| 2018/0062947 | A1* | 3/2018 | Smith | H04L 43/0811 |
| 2019/0036828 | A1* | 1/2019 | Bajaj | H04L 41/5009 |

\* cited by examiner

ON-DEMAND PROBING FOR QUALITY OF EXPERIENCE METRICS

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, the disclosure describes techniques for evaluating traffic flows for a particular application and initiating a corresponding synthetic probing process when the traffic flow for the particular application is received, with the probing process generating various Quality of Experience (QoE) metrics for the link on which the traffic flow will be transmitted. Similarly, when a Software-Defined Wide Area Networks (SD-WAN) appliance that implements the techniques described herein detects that the traffic flow for the particular application is completed, or that the SD-WAN appliance otherwise is not receiving the traffic flow, the SD-WAN appliance may cease the synthetic probing process that corresponds to the application.

In some SD-WANs, the SD-WAN routing appliance may specify a path for data flows between client devices and application servers. These paths are typically selected using service-level agreement (SLA) parameters and various metrics of the WAN links. While the SLA parameters may be more static in nature, or at least predetermined prior to the SD-WAN appliance receiving the flow, the metrics of the various WAN links may be more dynamic, as the metrics describing the capabilities of the particular WAN link may vary based on various current aspects of the network. These metrics are obtained by sending probe packets on the various links and analyzing the results of the transmission, where probe packets having the same size as the data packets in the data flow reasonably measure how the particular WAN link could handle the data flow.

Instead of sending one or more preconfigured probe packets over each WAN link to continuously have all of the necessary QoE metrics for every link, the techniques described herein may only initiate a probing process on the links that are currently receiving traffic. To amplify the benefits of these techniques, rather than sending a set of pre-configured probe packets whenever any traffic is flowing over a link, the SD-WAN appliance described herein may only utilize a subset of one or more of those probe packets that will provide valuable QoE metrics for the particular application associated with the traffic being received and transmitted.

If, during the middle of the transmission of the traffic flow, the traffic flow must be moved to a different link, the SD-WAN appliance described herein may cease the probing process on the previous link and initiate the probing process on the new link. Traffic flows may change links for any variety of reasons, including switching from a default WAN link to an optimal equal-cost multi-path (ECMP) link based on the QoE metrics and the SLA metrics for the application. Another reason may be that the SLA metrics for the application are no longer being met by the original link, but the SLA metrics would be satisfied by moving the traffic to the second link.

These techniques may also be extended within queues of the respective links. For instance, a singular WAN link may include multiple different queues. Rather than send the one or more probe packets over each queue of the WAN link, the SD-WAN appliance may only send the one or more probe packets over the particular queue that is experiencing the traffic. This additional level of granularity may increase the benefits of the techniques described herein.

There may be one or more advantages to using the techniques described herein. As one example, because the techniques of this disclosure may send probe packets on an as-needed basis, SD-WAN networks that implement the techniques described herein may be more scalable, enabling such networks to include more potential links and more client devices without correspondingly increasing the overhead caused by the probing processes. For systems having the same amount of links and client devices, an SD-WAN that implements the techniques described herein may consume fewer computing resources than previous systems, such as bandwidth, memory, and battery power. This may increase efficiency of the SD-WAN systems in general, as the SD-WAN that implements the techniques described herein may consume less bandwidth and decrease the processing time for generating QoE metrics. Overall, the techniques describe herein may decrease the load on an SD-WAN appliance by decreasing an amount of storage and processing of service level agreement (SLA) results, logs, etc.

In one example of the techniques described herein, a method is described, the method including, in response to receiving, by a network device, an application data packet of a data flow for an application, assigning, by the network device, the data flow to a first link of a plurality of links. The method also includes, in response to receiving the application data packet of the data flow, initiating, by the network device, a probing process for the data flow on the first link to determine one or more quality of experience (QoE) metrics for the first link. The method further includes detecting, by the network device, that the data flow is no longer being received by the network device. The method also includes, in response to detecting that the data flow is no longer being received by the network device, ceasing, by the network device, the probing process for the data flow on the first link.

In another example of the techniques described herein, a network device is described. The network device includes a memory. The network device also includes one or more processors in communication with the memory. The one or more processors are configured to, in response to receiving an application data packet of a data flow for an application, assign the data flow to a first link of a plurality of links. The one or more processors are also configured to, in response to receiving the application data packet of the data flow, initiate a probing process for the data flow on the first link to determine one or more quality of experience (QoE) metrics for the first link. The one or more processors are further configured to detect that the data flow is no longer being received by the network device. The one or more processors are also configured to, in response to detecting that the data flow is no longer being received by the network device, cease the probing process for the data flow on the first link.

In another example of the techniques described herein, a non-transitory computer-readable storage medium is described, the non-transitory computer-readable storage medium storing instructions thereon that when executed cause one or more processors, via execution of a software-defined networking (SDN) device, to, in response to receiving an application data packet of a data flow for an application, assign the data flow to a first link of a plurality of links. The instructions further cause the one or more processors to, in response to receiving the application data packet of the data flow, initiate a probing process for the data flow on the first link to determine one or more quality of experience (QoE) metrics for the first link. The instructions also cause the one or more processors to detect that the data flow is no longer being received by the network device. The instructions further cause the one or more processors to, in response to detecting that the data flow is no longer being received by the network device, cease the probing process for the data flow on the first link.

The details of one or more examples are set forth in the accompanying drawings and the description below. Other features, objects, and advantages will be apparent from the description and drawings, and from the claims.

DETAILED DESCRIPTION

Figure 1:
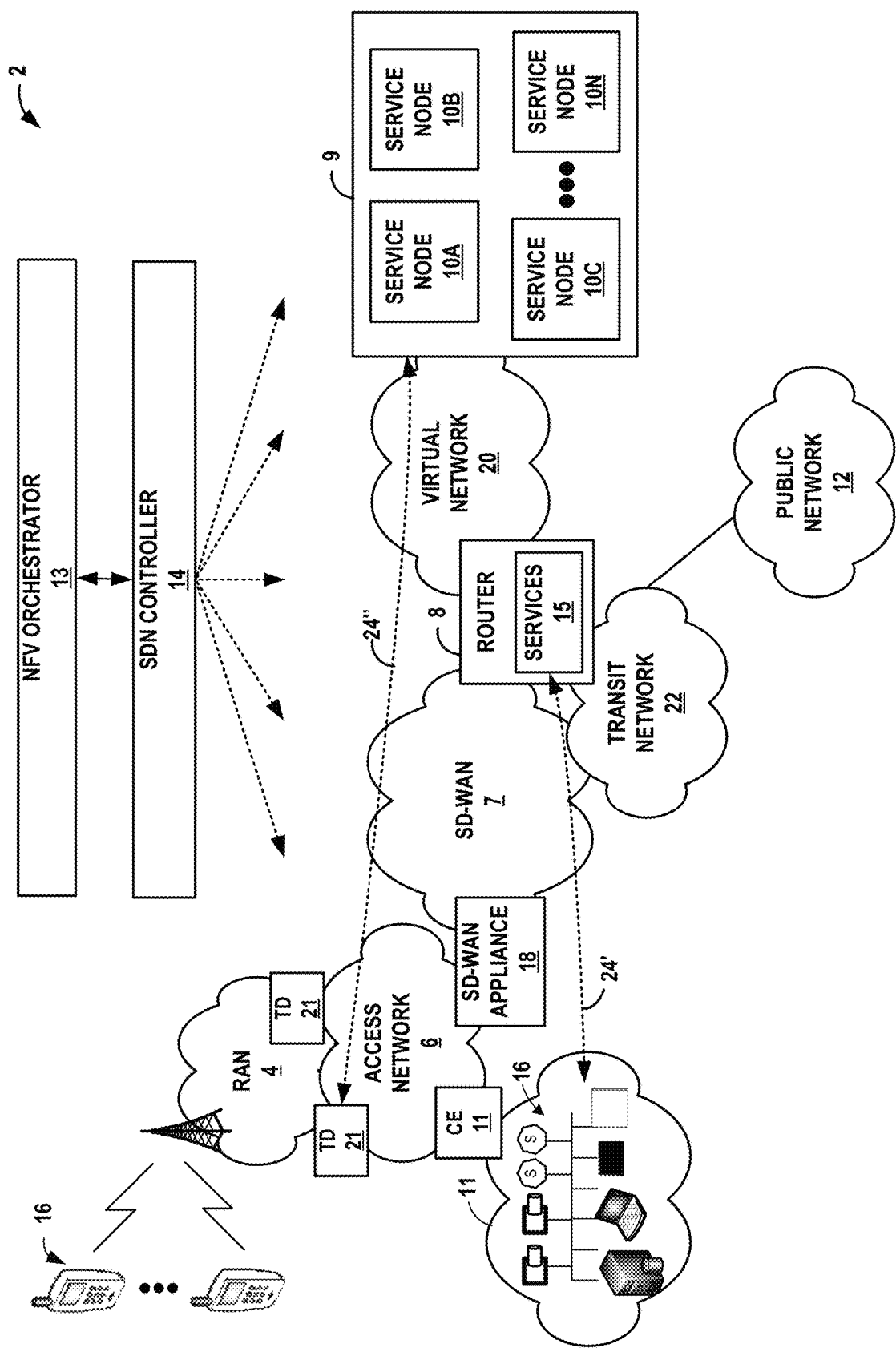
FIG. 1 is a block diagram illustrating an example software-defined wide area network system that performs an on-demand active synthetic probing process, in accordance with the techniques of this disclosure.

FIG. 1 is a block diagram illustrating an example software-defined wide area network system that performs an on-demand active synthetic probing process, in accordance with the techniques of this disclosure.

The example network system of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

In the example of FIG. 1, service provider network 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or router 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of service provider network 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, software-defined wide area network ("SD-WAN") appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 9. In addition, or alternatively, service provider network 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliance 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, service provider network 2 comprises a software defined network (SDN) and network functions virtualization (NFV) architecture. SDN controller device 14 may provide a high-level controller for configuring and managing the routing and switching infrastructure of service provider network 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within network system 2, such as SD-WAN appliance 18, perform application data monitoring using various application quality of experience (QoE) metric functions, such as real-time performance monitoring (RPM) or two-way active measurement protocol (TWAMP), for example. That is, RPM and TWAMP may be used within service provider network 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions and exchange test packets for the data sessions. In the example network architecture illustrated in FIG. 1, SD-WAN appliance 18 is configured to perform the QoE metric predictions. SD-WAN appliance 18 allows for load sharing across connections and adjusts traffic flows based on network conditions to improve performance.

In SD-WAN topology, there may be many "hubs and spokes" consisting of subscriber devices 16 and services 15 connected to each other. To measure the QoE metrics for each of these connections, SD-WAN appliance 18 may control the transmission of probe packets designed to measure these QoE metrics based on the transmission process across each of the respective connections, also called paths or links. However, all of the paths might not be experiencing traffic at a given time, meaning that continuing to transmit the probe packets over these links may provide limited benefit and only lead to degradation of the links or unnecessary central processing unit (CPU) usage on the devices transmitting and receiving the links. The probe packets may have actual sizes similar to the sizes of actual application traffic, meaning that the probe packets can consume a considerable amount of bandwidth when transmitted. Rather than continuously performing the synthetic probing on all those paths, the techniques described herein may streamline the process such that the probing process is only completed on the paths experiencing traffic. Once the traffic on that particular path stops, the probing process would also stop.

SD-WAN appliance 18, which performs the path selection algorithms, also determine QoE metrics, such as service level agreement (SLA) metrics that include round-trip time (RTT), jitter, and packet loss, which were influenced by applications' real-time parameters like packet size, queues and burst of packets to determine the best path. However, different applications have different packet sizes in their data flows. Furthermore, when a link in the network is not transmitting a data flow for a particular application received from services 15 and router 8, if active probe packets corresponding to that particular application are transmitted over the same link to determine the SLA metrics, there may be unnecessary traffic over those links that could consume valuable bandwidth that could be used for other data flows. As described below with respect to FIGS. 2 and 3, the techniques described herein show how SD-WAN appliance 18 can implement a machine learning algorithm to determine when traffic flows for particular applications are received, matching these traffic flows to particular configurations of probe packets, and beginning a synthetic probing process that is only active while the traffic flows for that particular application continue to be received.

In accordance with the techniques described herein, SD-WAN appliance 18 may not be performing a probing process on a first link of a plurality of links. Some time later, SD-WAN appliance 18 may receive an application data packet of a data flow for an application. In response to receiving the application data packet, SD-WAN appliance 18 may assign the data flow to the first link and initiate the probing process for the data flow on the first link to determine one or more QoE metrics for the first link. After the data flow is complete, or otherwise interrupted such that SD-WAN appliance 18 is no longer receiving the data flow, SD-WAN appliance 18 may detect that the data flow is no longer being received. In response to detecting that the data flow is no longer being received, SD-WAN appliance 18 may cease the probing process for the data flow on the first link. The probing process described herein may include either sending a group of pre-configured probe packets over the link regardless of the type of traffic received. In other instance, the probing process described herein may include only transmitting a singular probe packet or a smaller group of two or more probe packets that are designed specifically to gather QoE metrics that would be applicable to the application transmitting the data flow, based on variables such as the packet sizes in the data flow, burst presence or size within the data flow, packet sizes of the probe packets, and burstiness of the probe packets. A burst flow, measured by burstiness, involves data packets sent intermittently in bursts rather than as a continuous stream.

In some examples, the metrics carried by QoE probe packets transmitted during the probing process may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements may include keepalive or path connectivity, round trip time (RTT), path delay, packet jitter, packet re-ordering, packet loss, service latency measurements, or service load measurements based on the received metrics.

Figure 2:
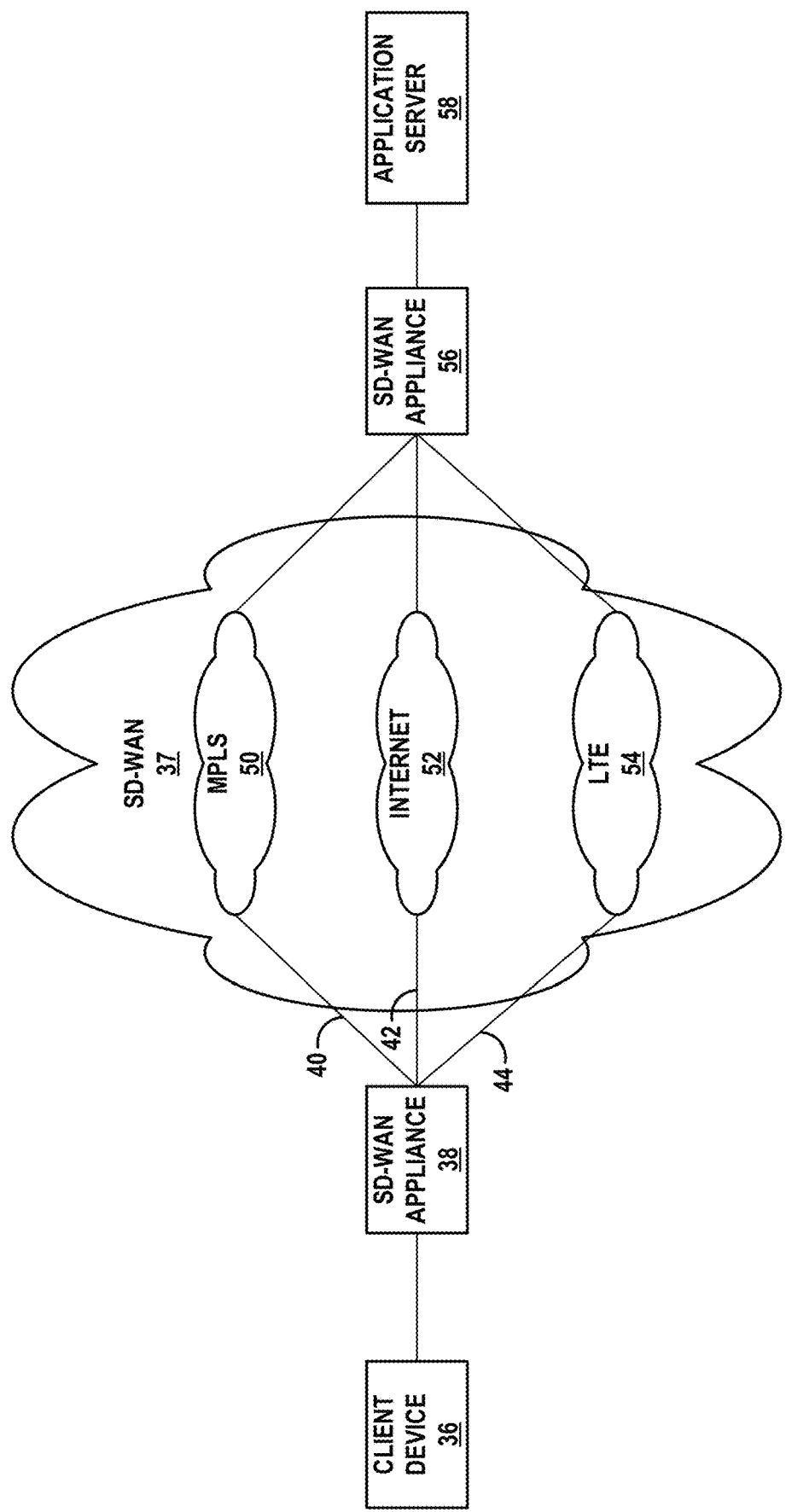
FIG. 2 is a block diagram illustrating an example software-defined wide area network, in accordance with one or more techniques of this disclosure.

FIG. 2 is a block diagram illustrating an example SD-WAN 37, in accordance with one or more techniques of this disclosure. In the example described herein, SD-WAN 7 includes three different WAN links: a first WAN link 40 coupling SD-WAN appliance 38 to a Multi-Protocol Layer Switching (MPLS) network 50, a second WAN link 42 coupling SD-WAN appliance 38 to Internet 52, and a third WAN link 44 coupling SD-WAN appliance 38 to long-term evolution (LTE) network 54. In other examples, SD-WAN 7 may include any number of links of any suitable type for transmitting data flows between the client side (e.g., client device 36 and SD-WAN appliance 38) and the application side (e.g., SD-WAN appliance 56 and application server 58).

In accordance with the techniques described herein, SD-WAN appliance 38 may receive an application data packet traffic flow for a particular application. For instance, client device 36 may begin executing an application locally. The execution of the application may include communicating with application server 58, and SD-WAN appliance 38 may be configured to forward the data flow from client device 36 to application server 58 via any of links 40, 42, and 44.

Upon receiving the data flow for the application from client device 36, SD-WAN appliance 38 may assign the data flow to one of links 40, 42, 44. SD-WAN appliance 38 may perform this assignment based on the link being the default link for the system, the link being the default link for the application, or the link being an optimal link at the time based on QoE metrics for each of the links. For instance, SD-WAN appliance 38 may assign the data flow to internet link 42. In addition to assigning the data flow, SD-WAN appliance 38 may also initiate a probing process on internet link 42 by beginning to send one or more probe packets over internet link 42 to determine one or more QoE metrics for internet link 42.

SD-WAN appliance 38 may, at a later time, detect that the traffic flow for the particular application has ended, either by completion or some other form of interruption. In response to this determination, SD-WAN appliance 38 may cease the synthetic probing process by refraining from sending additional probes corresponding to the particular application.

In some instances, SD-WAN appliance 38 may perform these techniques for multiple queues, or overlay paths, in each of WAN links 40, 42, and 44. For instance, Internet link 42 may include eight different queues or overlay links that are available to handle the data flow. Rather than generically send the plurality of probe packets to internet link 42, SD-WAN appliance 38 may send the probe packets for the particular probing process only on the queues within internet link 42 that is actually transmitting the data flow to obtain, in a more fine-grained sense, metrics for the queue in internet link 42. Throughout this disclosure, any technique performable on a per-link basis may also be performed on a per-queue basis within the respective link, including re-assigning data flows to other queues within the same link or re-assigning data flows from a queue in one link to a queue in a different link.

SD-WAN appliance 38 may configure a single default overlay link until the traffic is received. Once traffic is transmitted towards a particular node N1, node N1 can inform SD-WAN appliance 38, and SD-WAN appliance 38 can retrieve configurations (e.g., policies, synthetic probes that suit the application, etc.) for all links of that ECMP. From this point, the active probing starts. Until the SLA result of the synthetic probe is available, the traffic may be placed on a default link. Once the result is available, based on the SLA metrics, the traffic may be sent on links which meet the SLA.

Figure 3:
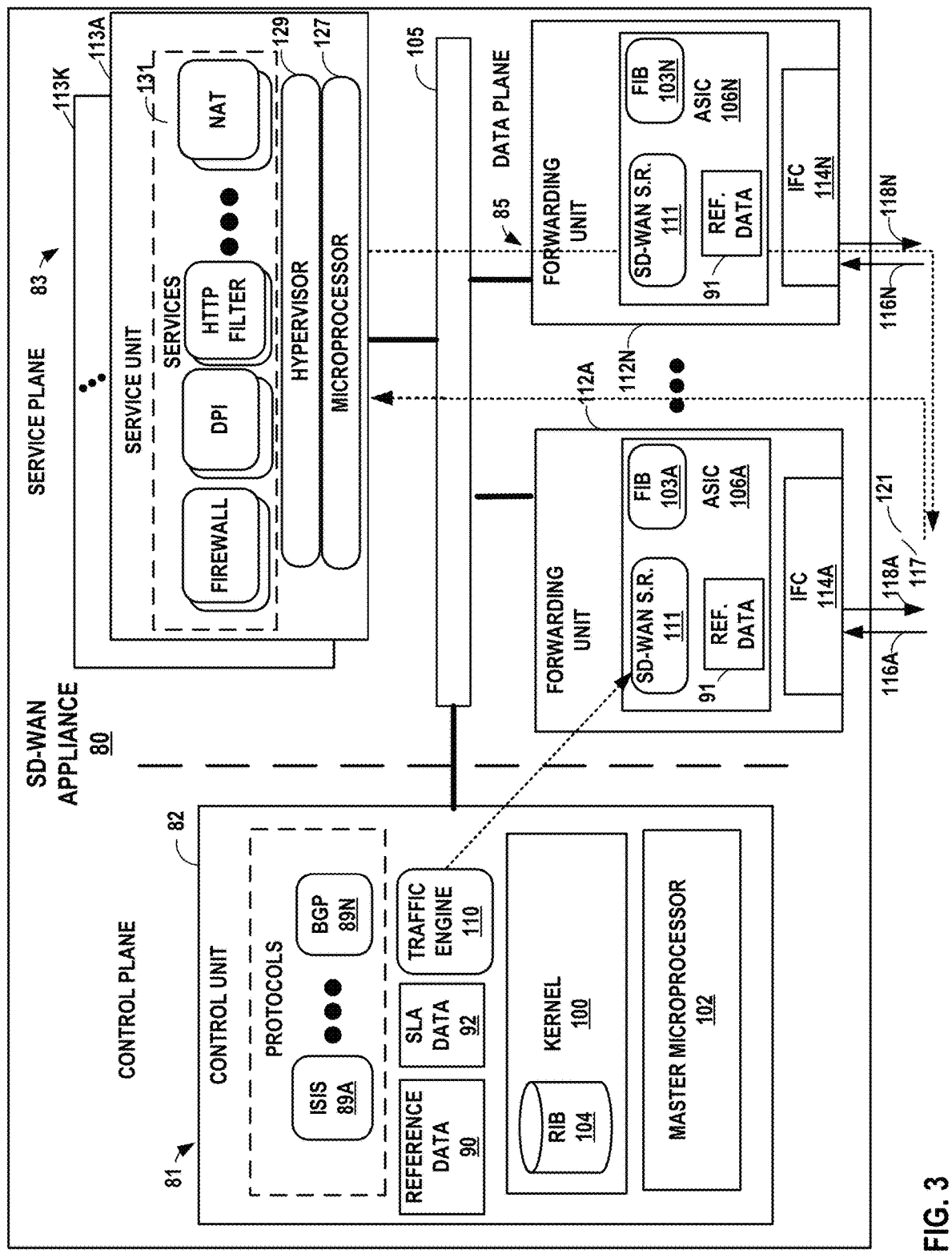
FIG. 3 is a block diagram illustrating an example software-defined wide area network appliance configured to execute one or more on-demand active synthetic probing functions using a traffic engine, in accordance with the techniques of this disclosure.

FIG. 3 is a block diagram illustrating an example software-defined wide area network appliance 80 configured to execute one or more on-demand active synthetic probing functions using a traffic engine 110, in accordance with the techniques of this disclosure. SD-WAN appliance 80 may be described herein within the context of service provider network 2 of FIG. 1, and may represent any of routers 8 or SD-WAN appliance 18, for example. Moreover, while described with respect to a particular network device, e.g., a router, the techniques may be implemented by any network device that may operate as an SD-WAN appliance, such as a client device, a Layer 3 (L3) or L2/L3 switch, or server.

In this example, SD-WAN appliance 80 is divided into three logical or physical "planes" to include a control plane 81 that performs control operations for the device, a data plane 85 for forwarding transit network traffic and a service plane 83 for application of one or more network services 87 to transit packet flows that are forwarded by the router. That is, router 81 implements three separate functionalities (e.g., the routing/control, forwarding data and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 83, and data plane 85 to deliver data units and control messages among the units. Switch fabric 105 may represent an internal switch fabric or cross-bar, bus, or link.

In the example of FIG. 3, control plane 81 includes control unit 82 having master microprocessor(s) 102, which executes device management services, subscriber authentication and control plane routing functionality of SD-WAN appliance 80. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein. Executables, such as traffic engine 110 and services 131, may be operable by microprocessor 102 to perform various actions, operations, or functions of SD-WAN appliance 80. For example, microprocessor 102 of SD-WAN appliance 80 may retrieve and execute instructions stored by various data stores that cause microprocessor 102 to perform the operations of traffic engine 110 and services 131.

One or more storage components (e.g., RIB 104) within SD-WAN appliance 80 may store information for processing during operation of SD-WAN appliance 80 (e.g., SD-WAN appliance 80 may store data accessed by traffic engine 110 and services 131 during execution at SD-WAN appliance 80). In some examples, the storage component is a temporary memory, meaning that a primary purpose of the storage component is not long-term storage. Storage components on SD-WAN appliance 80 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components, in some examples, also include one or more computer-readable storage media. Storage components in some examples include one or more non-transitory computer-readable storage mediums. Storage components may be configured to store larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with traffic engine 110 and services 131. Storage components 248 may include a memory configured to store data or other information associated with traffic engine 110 and services 131.

In general, control unit 82 represents hardware or a combination of hardware and software of control that implements control plane protocols 89A-89N ("routing protocols 89") to learn and maintain routing information within routing information base 104 ("RIB 104"). RIB 104 may include information defining a topology of a network, such as service provider network of FIG. 1. Routing protocols 89 interact with kernel 100 (e.g., by way of API calls) executing on control unit 82 to update RIB 104 based on routing protocol messages received by SD-WAN appliance 80. Kernel 100 may resolve the topology defined by routing information in RIB 104 to select or determine one or more routes through the network. For example, the kernel may generate forwarding information in the form of forwarding information bases 103A-103N ("FIBs 103") based on the network topology represented in RIB 104, i.e., perform route resolution. Typically, kernel 100 generates FIBs 103 in the form of radix or other lookup trees to map packet information (e.g., header information having destination information and/or a label stack) to next hops and ultimately to interface ports of IFCs 114 associated with respective forwarding units 112. Each of FIBs 103 may associate, for example, network destinations with specific next hops and corresponding IFCs 114. For MPLS-related traffic forwarding, FIBs 103 stores, for a given FEC, label information that includes an incoming label, an outgoing label, and a next hop for a packet. Control unit 82 may then program forwarding units 112 of data plane 85 with FIBs 103, which installs the FIBs within lookup ASICs 106.

Data plane 85, in this example, is a decentralized data plane in that data plane functionality and packet forwarding functionality is distributed among a plurality of forwarding units 112A-112N ("forwarding units 112"). In the example of SD-WAN appliance 80, data plane 85 includes forwarding units 112 that provide high-speed forwarding of network traffic received by interface cards 114A-114N ("IFCs 44") via inbound links 116A-116N to outbound links 118A-118N. Forwarding units 112 may each comprise one or more packet forwarding engine ("PFE") coupled to respective interface cards 114 and may represent, for example, a dense port concentrator (DPC), modular port concentrator (MPC), flexible physical interface card (PIC) concentrator (FPC), or another line card, for example, that is insertable within a chassis or combination of chassis of SD-WAN appliance 80.

As shown in the example of FIG. 3, each of forwarding units 112 includes a respective one of lookup ASICs 106A-106N ("lookup ASICs 106") that receives control and data session traffic via IFC cards 114, performs route lookups and, based on routes installed to FIBs 103, forwards the traffic either to control unit 82 (control traffic destined for SD-WAN appliance 80) or to one of forwarding units 40 (transit data traffic) for output via an interface to one of output links 48. In one example, lookup ASICs 106 are microcode-controlled chipsets programmably configured by a slave microprocessor (not shown) executing on each of forwarding units 112. Specifically, in this example, each of ASICs 106 may be controllable by internal microcode programmed by a slave microprocessor.

When forwarding packets, control logic within each lookup ASICs 106 traverses the respective FIB 103 and, upon reaching a FIB entry for the packet (e.g., a leaf node), the microcode-implemented control logic automatically selects one or more forwarding next hops (FNHs) for forwarding the packet. In this way, ASICs 106 of forwarding units 112 process packets by performing a series of operations on each packet over respective internal packet forwarding paths as the packets traverse the internal architecture of SD-WAN appliance 80. Operations may be performed, for example, on each packet based on any of a corresponding ingress interface, an ingress PFE 114, an egress PFE 114, an egress interface or other components of SD-WAN appliance 80 to which the packet is directed prior to egress, such as one or more service cards. Forwarding units 112 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of forwarding units 112 arranges forwarding structures as next hop data that can be chained together as a series of "hops" along an internal packet forwarding path for the network device. In many instances, the forwarding structures perform lookup operations within internal memory of ASICs 106, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 106 determines the manner in which a packet is forwarded or otherwise processed by forwarding units 112 from its input interface on one of IFCs 114 to its output interface on one of IFCs 114.

Lookup ASICs 106 may be implemented using forwarding application specific integrated circuits (ASICs), field programmable gate arrays (FPGAs), or any other equivalent integrated or discrete logic circuitry, as well as any combinations of such components. Each of forwarding units 112 may include substantially similar components to perform substantially similar functionality.

Service plane 83 of SD-WAN appliance 80 includes a plurality of service units 113A-113K ("service units 13") that may be, as examples, removable service cards, which are configured to apply network services to packets flowing through data plane 85. That is, when forwarding packets, forwarding units 112 may steer packets to service plane 83 for application of one or more network services 131 by service units 113. In this example, each of service units 113 includes a microprocessor 127 configured to execute hypervisor 129 to provide an operating environment for a plurality of network services 131. As examples, service units 113 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of services 131 may be implemented, for example, as virtual machines or containers executed by hypervisor 129 and microprocessor 127.

In the example of FIG. 3, control unit 82 provides an operating environment for traffic engine 110. In some examples, control unit 82 may use traffic engine 110 to execute one or more TWAMP or RPM logical roles, such as a control client, a server, a sessions sender, and a session reflector.

If there are N number of nodes in the SD-WAN network that includes SD-WAN appliance 80, each node may be connected to another by multiple equal cost overlay paths called a path group. If M is the number of overlay paths between any two given nodes, and P is the number of SLA probes with different probe types and/or probe parameters, the number of flows that need to be maintained in a normal case would be:

$$(N*(N-1)/2)*M*P \quad (1)$$

At a given time, if the traffic may only actually being transmitted on X links of the N*(N−1)/2 total links. As such, the number of flows that need to be maintained by SD-WAN appliance 80 is only:

$$X*M*P \quad (2)$$

Traffic engine 110 may be configured to perform the techniques described throughout this disclosure. For instance, in accordance with the techniques described herein, traffic engine 110 may not be performing a probing process on a first link of a plurality of links. Sometime later, traffic engine 110 may receive an application data packet of a data flow for an application.

In response to receiving the application data packet, traffic engine 110 may assign the data flow to the first link and initiate the probing process for the data flow on the first link to determine one or more QoE metrics for the first link. In some instances, initiating the probing process for the data flow includes sending one or more synthetic probe packets over the first link to determine the one or more QoE metrics for the first link. These synthetic probe packets may simply be a plurality of probe packets that each have a unique, default configuration, and this plurality of probe packets may be independent of any particular characteristics of the application or the data flow.

In other instances, traffic engine 110 may perform application-specific probing in addition to the link-specific probing described throughout this disclosure. For example, in response to traffic engine 110 receiving the application data packet of the data flow for the application, traffic engine 110 may determine an application signature of the application data packet, such as through the use of deep packet inspection (DPI). Traffic engine 110 may then determine, based on the application signature, a probe packet configuration for the data flow. This probe packet configuration may be such that the packet size and/or burstiness of the probe packets sent over the first link are similar to the packet size and/or burstiness of the application traffic that is being processed by traffic engine 110. Traffic engine 110 may use the DPI to determine this information in real-time, or may use DPI to determine this information, store indications of the application signature and this information in a database, and then traffic engine 110 may retrieve that information when the application sends additional traffic at a later time. In these instances, initiating the probing process for the data flow would include traffic engine 110 sending one or more probe packets configured according to the probe packet configuration over the first link to determine the one or more QoE metrics for the first link.

In some instances, the plurality of links may be a plurality of equal-cost multi-path (ECMP) links. In these instances, initiating the probing process for the data flow may include, in response to receiving the application data packet of the data flow for the application, traffic engine 110 determining an application signature of the application data packet, such as by using DPI. Traffic engine 110 may then determine, based on the application signature, a set of one or more service level agreement (SLA) metrics for the application and a destination of the data flow. While traffic engine 110 determines the optimal link for the data flow towards the destination, traffic engine 110 may assign the data flow to a default link of the plurality of ECMP links. Traffic engine 110 may then send one or more probe packets on each of the plurality of links to determine respective QoE metrics for each ECMP link of the plurality of ECMP links. Now having the QoE metrics for each ECMP link and the SLA metrics, traffic engine 110 may determine which ECMP link has QoE metrics that satisfy the SLA metrics for the application. Traffic engine 110 may then re-assign the data flow from the default link to the ECMP link that satisfies the SLA metrics for the application, refraining from sending additional probe packets on each link of the plurality of ECMP links other than the first link.

In some further instances, the techniques described herein may be performed on a queue level as opposed to a whole link level. For instance, when the first link includes a plurality of queues, traffic engine 110 may assign the data flow to the first link by assigning the data flow to a first queue of the plurality of queues of the first link. When initiating the probing process for the data flow, traffic engine 110 may send the one or more probe packets it would typically send over the entire link over only the first queue of the first link to determine the one or more QoE metrics for the first queue, as opposed to over every queue in the link.

After the data flow is complete, or otherwise interrupted such that traffic engine 110 is no longer receiving the data flow, traffic engine 110 may detect that the data flow is no longer being received. To account for potentially momentary lapses in the data packet transmission, in some instances, traffic engine 110 may detect that no more data packets are being received in the data flow and wait a threshold amount of time to determine if any additional data packets are received. If additional data packets are received within the threshold amount of time, traffic engine 110 may continue the probing process for the data flow on the first link. Otherwise, if no additional data packets are received after the threshold amount of time passes, traffic engine 110 may confirm that the data flow is no longer being received.

In response to detecting that the data flow is no longer being received, traffic engine 110 may cease the probing process for the data flow on the first link. In some instances, ceasing the probing process for the data flow includes refraining from sending additional synthetic probe packets over the first link, whether those packets be the default packets or the specifically configured data packets, and whether the probe packets are being sent over the link in general or on a particular queue.

Sometime after initiating the probing process for the data flow, other traffic may be received or some other incident may occur causing the one or more QoE metrics for the first link to fail to satisfy service level agreement (SLA) metrics for the application. Once traffic engine 110 determines this to be the case, traffic engine 110 may send one or more probe packets over a second link of the plurality of links to determine one or more QoE metrics for the second link. Traffic engine 110 may send the one or more probe packets over the links one-by-one until a satisfactory link is found, or may, approximately simultaneously, send each of the one or more probe packets over each of the plurality of links that reach the intended destination to determine the QoE metrics for each link at the same time.

Regardless, once traffic engine 110 determines that the one or more QoE metrics for the second link satisfy the SLA metrics for the application, traffic engine 110 may re-assign the first data flow from the first link to the second link. Traffic engine 110 may then cease the probing process for the data flow on the first link and continue the probing process for the data flow on the second link.

Traffic engine 110 may handle additional data flows in a similar manner, ensuring that the probing process is only occurring over the links that are currently experiencing traffic. For instance, traffic engine 110 may receive a second application data packet of a second data flow for a second application while the first data flow is still being transmitted over the first link. In response to receiving the second application data packet, traffic engine 110 may assign the second data flow to a second link of a plurality of links, the second link being different than the first link. Traffic engine 110 may then initiate a probing process for the second data flow on the second link to determine one or more QoE metrics for the second link. At this point, traffic engine 110 would be probing only two links of the plurality of links as opposed to every link of the plurality of links. In a similar way as for the traffic received for the first link, traffic engine 110 may detect that the second data flow is no longer being received by the network device. In response to detecting that the second data flow is no longer being received, traffic engine 110 may cease the probing process for the second data flow on the second link.

An optional addition to the techniques described herein may be to run the pre-configured synthetic probes that suit the application type. In some basic examples, traffic engine 110 may run all of the pre-configured synthetic probes upon traffic flows being transmitted over a particular link.

In some other instances, traffic engine 110 may perform the on-demand probing techniques at the overlay path level, providing even more granularity to the system. The techniques described herein may help in scaling up the nodes in the mesh network. In SD-WAN environments, these probes go on overlays which may be MPLS, GRE, IPSEC, or combined MPLS/GRE/IPSEC based.

Traffic engine 110 may continue this process cyclically, initiating probing processes for applications as they are received and assigned to particular links, and ceasing to probe links that are no longer receiving application traffic. In this way, traffic engine 110 may be more scalable, enabling such networks to include more potential links and more client devices without correspondingly increasing the overhead caused by the probing processes. For systems having the same amount of links and client devices, traffic engine 110 consume fewer computing resources over the SD-WAN than previous systems, such as bandwidth, memory, and battery power. This may increase efficiency the efficiency of the SD-WAN systems in general, as traffic engine 110 may consume less bandwidth and decrease the processing time for generating QoE metrics. Overall, the techniques describe herein may decrease the load on traffic engine 110 by decreasing the processing of service level agreement (SLA) results, logs, etc.

Figure 4:
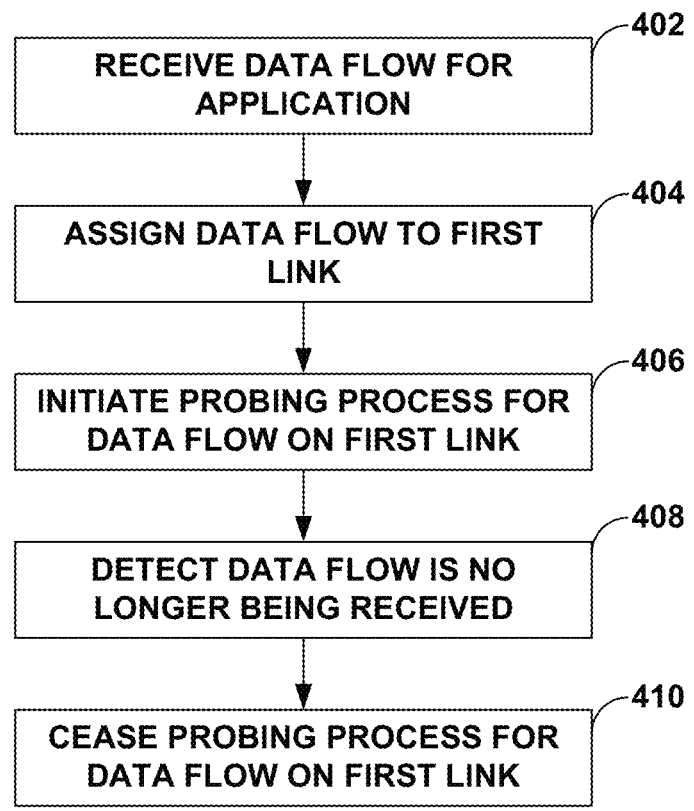
FIG. 4 is a flow diagram illustrating an example technique for a software-define wide area network system that performs on-demand active synthetic probing functions, in accordance with the techniques of this disclosure.

FIG. 4 is a flow diagram illustrating an example technique for a software-define wide area network system that performs on-demand active synthetic probing functions, in accordance with the techniques of this disclosure. The example operation may be performed by traffic engine 110 executed on SD-WAN appliance 18 from FIG. 1. The following are steps of the process, although other examples of the process performed in the techniques of this disclosure may include additional steps or may not include some of the below-listed steps.

In accordance with the techniques described herein, SD-WAN appliance 18 may not initially be performing a probing process on a first link of a plurality of links. Sometime later, traffic engine 110 may receive an application data packet of a data flow for an application (402). In response to receiving the application data packet, traffic engine 110 may assign the data flow to the first link (404) and initiate the probing process for the data flow on the first link to determine one or more QoE metrics for the first link (406). After the data flow is complete, or otherwise interrupted such that SD-WAN appliance 18 is no longer receiving the data flow, traffic engine 110 may detect that the data flow is no longer being received (408). In response to detecting that the data flow is no longer being received, traffic engine 110 may cease the probing process for the data flow on the first link (410).

The probing process described herein may include either sending a group of pre-configured probe packets over the link regardless of the type of traffic received. In other instance, the probing process described herein may include only transmitting a singular probe packet or a smaller group of two or more probe packets that are designed specifically to gather QoE metrics that would be applicable to the application transmitting the data flow, based on variables such as the packet sizes in the data flow, burst presence or size within the data flow, packet sizes of the probe packets, and burstiness of the probe packets. A burst flow, measured by burstiness, involves data packets sent intermittently in bursts rather than as a continuous stream.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

The invention claimed is:

1. A method comprising:
in response to receiving, by a network device, a first application data packet of a first data flow for a first application, assigning, by the network device, the first data flow to a first link of a plurality of links;
in response to receiving the first application data packet of the first data flow, initiating, by the network device, a probing process for the first data flow on the first link to determine one or more quality of experience (QoE) metrics for the first link;
detecting, by the network device, that the first data flow is no longer being received by the network device;
in response to detecting that the first data flow is no longer being received by the network device, ceasing, by the network device, the probing process for the first data flow on the first link;
after initiating the probing process on the first link and before ceasing the probing process on the first link:
in response to receiving, by the network device, a second application data packet of a second data flow for a second application, assigning, by the network device, the second data flow to a second link of the plurality of links, the second link different than the first link;
in response to receiving the second application data packet of the second data flow, initiating, by the network device, a probing process for the second data flow on the second link to determine one or more QoE metrics for the second link;
detecting, by the network device, that the second data flow is no longer being received by the network device; and
in response to detecting that the second data flow is no longer being received by the network device, ceasing, by the network device, the probing process for the second data flow on the second link.

2. The method of claim 1, wherein initiating the probing process for the first data flow comprises sending, by the network device, one or more synthetic probe packets over the first link to determine the one or more QoE metrics for the first link, and
wherein ceasing the probing process for the first data flow comprises refraining, by the network device, from sending additional synthetic probe packets over the first link.

3. The method of claim 1, wherein initiating the probing process for the first data flow comprises sending, by the network device, a plurality of probe packets over the first link to determine the one or more QoE metrics for the first link, wherein each probe packet of the plurality of probe packets has a unique default configuration.

4. The method of claim 1, further comprising:
in response to receiving, by the network device, the first application data packet of the first data flow for the first application, determining, by the network device, an application signature of the first application data packet; and
determining, by the network device and based on the application signature, a probe packet configuration for the first data flow.

5. The method of claim 4, wherein initiating the probing process for the first data flow comprises sending, by the network device, one or more probe packets configured according to the probe packet configuration over the first link to determine the one or more QoE metrics for the first link, and
wherein ceasing the probing process for the first data flow comprises refraining, by the network device, from sending additional probe packets configured according to the probe packet configuration over the first link.

6. The method of claim 4, wherein determining the application signature of the first application data packet comprises:
performing, by the network device, deep packet inspection on the first application data packet.

7. The method of claim 1, wherein the plurality of links comprise a plurality of equal-cost multi-path (ECMP) links including the first link, the method further comprising:
prior to assigning the first data flow to the first link:
in response to receiving, by the network device, the first application data packet of the first data flow for the first application, determining, by the network device, an application signature of the first application data packet;

determining, by the network device and based on the application signature, a set of one or more service level agreement (SLA) metrics for the first application and a destination of the first data flow;

assigning, by the network device, the first data flow to a default link of the plurality of ECMP links;

wherein initiating the probing process for the first data flow comprises sending, by the network device, one or more probe packets on each of the plurality of ECMP links to determine respective QoE metrics for each ECMP link of the plurality of ECMP links;

determining, by the network device and based on the respective QoE metrics for each link of the plurality of ECMP links, that the QoE metrics for the first link satisfy the SLA metrics for the first application;

wherein assigning the first data flow to the first link comprises re-assigning, by the network device, the first data flow from the default link to the first link; and refraining, by the network device, from sending additional probe packets for the first data flow on each ECMP link of the plurality of ECMP links other than the first link.

8. The method of claim 1, wherein the first link comprises is associated with a plurality of queues, wherein assigning the first data flow to the first link comprises assigning, by the network device, the first data flow to a first queue of the plurality of queues with which the first link is associated, wherein initiating the probing process for the first data flow comprises sending, by the network device, one or more probe packets over only the first queue of the first link to determine the one or more QoE metrics for the first queue, and wherein ceasing the probing process for the first data flow comprises refraining, by the network device, from sending additional probe packets over the first queue of the first link.

9. The method of claim 1, further comprising:

after initiating the probing process for the first data flow, determining, by the network device, that the one or more QoE metrics for the first link fail to satisfy service level agreement (SLA) metrics for the first application;

in response to determining that the one or more QoE metrics for the first link fail to satisfy the SLA metrics for the first application, sending, by the network device, one or more probe packets over the second link of the plurality of links to determine one or more QoE metrics for the second link;

in response to determining that the one or more QoE metrics for the second link satisfy the SLA metrics for the first application:

re-assigning, by the network device, the first data flow from the first link to the second link;

ceasing, by the network device, the probing process for the first data flow on the first link; and continuing, by the network device, the probing process for the first data flow on the second link.

10. A network device comprising:

a memory configured to store a reference data store; and one or more processors in communication with the memory, the one or more processors configured to:

in response to receiving a first application data packet of a first data flow for a first application, assign the first data flow to a first link of a plurality of links;

in response to receiving the first application data packet of the first data flow, initiate a probing process for the first data flow on the first link to determine one or more quality of experience (QoE) metrics for the first link;

detect that the first data flow is no longer being received by the network device; and in response to detecting that the first data flow is no longer being received by the network device, cease the probing process for the first data flow on the first link;

after initiating the probing process on the first link and before ceasing the probing process on the first link:

in response to receiving a second application data packet of a second data flow for a second application, assign the second data flow to a second link of the plurality of links, the second link different than the first link;

in response to receiving the second application data packet of the second data flow, initiate, a probing process for the second data flow on the second link to determine one or more QoE metrics for the second link;

detect that the second data flow is no longer being received by the network device; and in response to detecting that the second data flow is no longer being received by the network device, cease the probing process for the second data flow on the second link.

11. The network device of claim 10, wherein the one or more processors are further configured to:

in response to receiving, by the network device, the first application data packet of the first data flow for the first application, determine an application signature of the first application data packet; and determine, based on the application signature, a probe packet configuration for the first data flow, wherein the one or more processors being configured to initiate the probing process for the first data flow comprises the one or more processors being configured to send one or more probe packets configured according to the probe packet configuration over the first link to determine the one or more QoE metrics for the first link, and wherein the one or more processors being configured to cease the probing process for the first data flow comprises the one or more processors being configured to refrain from sending additional probe packets configured according to the probe packet configuration over the first link.

12. The network device of claim 10, wherein the plurality of links comprise a plurality of equal-cost multi-path (ECMP) links including the first link, wherein the one or more processors are further configured to:

in response to receiving the first application data packet of the first data flow for the first application, determine an application signature of the first application data packet;

determine, based on the application signature, a set of one or more service level agreement (SLA) metrics for the first application and a destination of the first data flow;

assign the first data flow to a default link of a plurality of ECMP links;

wherein the one or more processors being configured to initiate the probing process for the data flow comprises the one or more processors being configured to send one or more probe packets on each of the plurality of ECMP links to determine respective QoE metrics for each ECMP link of the plurality of ECMP links;
determine, based on the respective QoE metrics for each link of the plurality of ECMP links, that the QoE metrics for the first link satisfy the SLA metrics for the first application;
wherein the one or more processors being configured to assign the first data flow to the first link comprises the one or more processors being configured to re-assign the first data flow from the default link to the first link; and
refrain from sending additional probe packets for the first data flow on each ECMP link of the plurality of ECMP links other than the first link.

13. The network device of claim 10, wherein the one or more processors are further configured to:
after initiating the probing process for the first data flow, determine that the one or more QoE metrics for the first link fail to satisfy service level agreement (SLA) metrics for the first application;
in response to determining that the one or more QoE metrics for the first link fail to satisfy the SLA metrics for the first application, send one or more probe packets over the second link of the plurality of links to determine one or more QoE metrics for the second link;
in response to determining that the one or more QoE metrics for the second link satisfy the SLA metrics for the first application:
re-assign the first data flow from the first link to the second link;
cease the probing process for the first data flow on the first link; and
continue the probing process for the first data flow on the second link.

14. The network device of claim 10, wherein the network device comprises a software-defined networking (SDN) device.

15. The network device of claim 10, wherein the one or more processors being configured to initiate the probing process for the first data flow comprises the one or more processors being configured to send one or more synthetic probe packets over the first link to determine the one or more QoE metrics for the first link, and
wherein the one or more processors being configured to cease the probing process for the first data flow comprises the one or more processors being configured to refrain from sending additional synthetic probe packets over the first link.

16. The network device of claim 10, wherein the one or more processors being configured to initiate the probing process for the first data flow comprises the one or more processors being configured to send a plurality of probe packets over the first link to determine the one or more QoE metrics for the first link, wherein each probe packet of the plurality of probe packets has a unique default configuration.

17. The network device of claim 10, wherein the first link is associated with a plurality of queues,
wherein the one or more processors being configured to assign the first data flow to the first link comprises the one or more processors being configured to assign the first data flow to a first queue of the plurality of queues with which the first link is associated,
wherein the one or more processors being configured to initiate the probing process for the first data flow comprises the one or more processors being configured to send one or more probe packets over only the first queue of the first link to determine the one or more QoE metrics for the first queue, and
wherein ceasing the probing process for the first data flow comprises refraining, by the network device, from sending additional probe packets over the first queue of the first link.

18. A non-transitory computer-readable storage medium storing instructions thereon that when executed cause one or more processors, via execution of a software-defined networking (SDN) device, to:
in response to receiving a first application data packet of a first data flow for a first application, assign the first data flow to a first link of a plurality of links;
in response to receiving the first application data packet of the first data flow, initiate a probing process for the first data flow on the first link to determine one or more quality of experience (QoE) metrics for the first link;
detect that the first data flow is no longer being received by the network device;
in response to detecting that the first data flow is no longer being received by the network device, cease the probing process for the first data flow on the first link; and
after initiating the probing process on the first link and before ceasing the probing process on the first link:
assign the second data flow to a second link of the plurality of links, the second link different than the first link;
in response to receiving the second application data packet of the second data flow, initiate, a probing process on the second link to determine one or more QoE metrics for the second link;
detect that the second data flow is no longer being received by the network device; and
in response to detecting that the second data flow is no longer being received by the network device, cease the probing process on the second link.

19. The non-transitory computer-readable storage medium of claim 18, wherein the instructions, when executed, further cause the one or more processors to:
in response to receiving, by the network device, the first application data packet of the first data flow for the first application, determine an application signature of the first application data packet; and
determine, based on the application signature, a probe packet configuration for the first data flow,
wherein the instructions that cause the one or more processors to initiate the probing process for the first data flow comprise instructions that, when executed, cause the one or more processors to send one or more probe packets configured according to the probe packet configuration over the first link to determine the one or more QoE metrics for the first link, and
wherein the instructions that cause the one or more processors to cease the probing process for the first data flow comprise instructions that, when executed, cause the one or more processors to refrain from sending additional probe packets configured according to the probe packet configuration over the first link.

20. The non-transitory computer-readable storage medium of claim 18, wherein the plurality of links comprise a plurality of equal-cost multi-path (ECMP) links including the first link, wherein the instructions that cause the one or more processors to initiate the probing process for the first data flow comprise instructions that, when executed, cause the one or more processors to:

in response to receiving the first application data packet of the first data flow for the application, determine an application signature of the first application data packet;

determine, based on the application signature, a set of one or more service level agreement (SLA) metrics for the first application and a destination of the first data flow;

assign the first data flow to a default link of a plurality of ECMP links;

wherein the instructions that cause the one or more processors to initiate the probing process for the data flow comprise instructions that cause the one or more processors to send one or more probe packets on each of the plurality of ECMP links to determine respective QoE metrics for each ECMP link of the plurality of ECMP links;

determine, based on the respective QoE metrics for each link of the plurality of ECMP links, that the QoE metrics for the first link satisfy the SLA metrics for the first application;

wherein the one or more processors being configured to assign the first data flow to the first link comprises the one or more processors being configured to re-assign the first data flow from the default link to the first link; and refrain from sending additional probe packets for the first data flow on each ECMP link of the plurality of ECMP links other than the first link.

\* \* \* \* \*